United States Patent
Wang et al.

(10) Patent No.: US 11,106,917 B2
(45) Date of Patent: Aug. 31, 2021

(54) SURVEILLANCE SYSTEM WITH HUMAN-MACHINE INTERFACE

(71) Applicant: TURING VIDEO, San Mateo, CA (US)

(72) Inventors: Fang Wang, Redwood City, CA (US); Song Cao, San Mateo, CA (US)

(73) Assignee: Turing Video, San Mateo, CA (US)

( * ) Notice: Subject to any disclaimer, the term of this patent is extended or adjusted under 35 U.S.C. 154(b) by 317 days.

(21) Appl. No.: 16/019,308

(22) Filed: Jun. 26, 2018

(65) Prior Publication Data

US 2019/0019039 A1 Jan. 17, 2019

Related U.S. Application Data

(60) Provisional application No. 62/528,447, filed on Jul. 4, 2017.

(51) Int. Cl.
*G05D 1/00* (2006.01)
*G05D 3/00* (2006.01)
(Continued)

(52) U.S. Cl.
CPC .......... *G06K 9/00771* (2013.01); *B25J 9/163* (2013.01); *B25J 13/003* (2013.01); *B25J 13/006* (2013.01); *B25J 13/084* (2013.01); *G06K 9/00369* (2013.01); *G06K 9/00973* (2013.01); *G08B 6/00* (2013.01); *G08B 21/22* (2013.01)

(58) Field of Classification Search
CPC .......... G06K 9/00771; G06K 9/00973; G06K 9/00369; G08B 6/00; G08B 21/22; B25J 9/163; B25J 13/006; B25J 13/084; B25J 13/003
See application file for complete search history.

(56) References Cited

U.S. PATENT DOCUMENTS

| | | | |
|---|---|---|---|
| 9,541,410 B1 * | 1/2017 | Herbach | G01C 21/34 |
| 10,380,875 B1 * | 8/2019 | Roberts | G08B 27/00 |

(Continued)

OTHER PUBLICATIONS

Xinyu Wang et al., "Robust and real-time deep tracking via multi-scale domain adaptation", arXiv preprint arXiv:1701.00561, Jan. 3, 2017, 6 pages.

(Continued)

*Primary Examiner* — Harry Y Oh
*Assistant Examiner* — Sohana Tanju Khayer
(74) *Attorney, Agent, or Firm* — Sheppard Mullin Richter & Hampton LLP

(57) ABSTRACT

A surveillance system may comprise a control device and at least one robotic device. The control device is associated with a user and configured to request to connect to the at least one robotic device and in response to being connected, communicate a characteristic of the user to the at least one robotic device. The at least one robotic device comprises a platform to carry the user, and may be configured to in response to the request of the control device, verify identity of the control device of the user; in response to the identity of the control device of the user being verified, connect to the control device; define parameters of the at least one robotic device based on the characteristic of the user; and adjust the parameters of the at least one robotic device according to a riding pattern of the user.

15 Claims, 6 Drawing Sheets

(51) Int. Cl.
*G06F 7/00* (2006.01)
*G06F 17/00* (2019.01)
*G06K 9/00* (2006.01)
*B25J 9/16* (2006.01)
*G08B 21/22* (2006.01)
*B25J 13/00* (2006.01)
*B25J 13/08* (2006.01)
*G08B 6/00* (2006.01)

(56) References Cited

U.S. PATENT DOCUMENTS

| | | | |
|---|---|---|---|
| 2015/0166138 A1* | 6/2015 | Lovley, II | B62K 9/02 180/210 |
| 2016/0375768 A1* | 12/2016 | Konet | G08G 1/166 348/148 |
| 2017/0015318 A1* | 1/2017 | Scofield | G08G 1/097 |
| 2017/0243452 A1* | 8/2017 | Levesque | G06F 3/016 |
| 2018/0260630 A1 | 9/2018 | Cao et al. | |
| 2018/0290660 A1* | 10/2018 | Huang | B60W 50/14 |
| 2018/0304471 A1* | 10/2018 | Tokuchi | B25J 11/0005 |
| 2019/0025580 A1* | 1/2019 | Nagano | G02B 27/64 |
| 2020/0016745 A1* | 1/2020 | Tang | G05B 13/042 |
| 2020/0175767 A1* | 6/2020 | Stivi | G08B 25/10 |

OTHER PUBLICATIONS

U.S. Appl. No. 62/469,534, filed Mar. 10, 2017 (26 pages).

\* cited by examiner

SURVEILLANCE SYSTEM WITH HUMAN-MACHINE INTERFACE

CROSS REFERENCE TO RELATED APPLICATION

This application claims the benefit of priority to U.S. Provisional Application No. 62/528,447, filed with the United States Patent and Trademark Office on Jul. 4, 2017, and entitled "SURVEILLANCE SYSTEM WITH HUMAN-MACHINE INTERFACE," which is hereby incorporated by reference in its entirety.

TECHNICAL FIELD

The present invention relates to a surveillance system, and in particular, to a surveillance system with human-machine interface.

BACKGROUND

Video surveillance has been widely applied in various domains. Consequently, demands on accurate and in-time surveillance continue to grow. Some existing surveillance systems may use robots to facilitate surveillance. These robots may work independently throughout a facility, capturing video footage, detecting abnormal situations, and transmitting information back to a remote central monitoring station. For example, SMP Robotics Systems Corp. has developed and commercialized several types of mobile security robots, which allow cooperation between mobile security robots and security officers. Drones may also be used to capture video and transmit information back to a central monitoring station.

Some robots used in surveillance systems may also include a manned platform for carrying a person during operation. For example, the manned platform may be in a form of a bicycle, a motorcycle, a quadricycle, or may adopt any other suitable forms as long as it provides the function of carrying a person. It is desirable that a robot can communicate with the person during the ride. It is known that relevant human-machine communication technologies have been applied in various fields. For example, companion robots, such as Jibo, communicate with a client through a screen. However, such communication or interaction technology is not commonly used in surveillance systems. Moreover, common human-machine communication technologies may not fully adapt to a surveillance situation.

Take the following scenario as an example: a security officer needs to go to a potential crime scene along with a robot when a possible crime has been reported or detected. One desirable solution may be as follows: the security officer may ride on the robot to go to the crime scene, and the robot can remind the security officer of the road condition, such as a coming sharp turn, and/or give an update of real-time crime scene to the security officer. During this process, the robot may operate in an autopilot mode; however, the security officer can always take over and control the robot according to actual needs. In this scenario, conventional human-machine communication technologies will pose several drawbacks.

In one aspect, for example, a robot may report the crime scene via voice communication. However, it may be less efficient in the above scenario, because a crime scene typically changes rapidly. For example, before the robot finishes reporting one situation via voice communication, the situation itself may already changes. Alternatively, the robot may also send real-time video. However, video communication requires the security officer to pay extra attention to watch the video, which is risky in complicated situations. For example, when the security officer is riding on the robot and watching the video, he may not be able to pay attention to the road condition (e.g., people, cars, etc.) and thus an accident may be caused.

Moreover, conventional human-machine communication technologies fail to distinguish different objects (e.g., different human or scenarios), resulting in troubles. For example, when the robot is approaching a crime scene, it may inform or alert the pedestrians around the crime scene of its driving direction so that they may avoid the robot. However, if a criminal is also nearby, the criminal may also get the "alert" and escape.

In another aspect, a conventional robot with a manned platform usually does not have a "user-preference" setup or a self-learning ability, resulting in poor user experience. Still take the above mentioned scenario as an example, it is desired that the robot can provide an optimal speed and acceleration, e.g., based on the height and weight of a specific security officer, as well as an urgent level of the situation. However, a conventional robot cannot adjust its speed and acceleration automatically, and the security officer will have to adjust relevant parameters by himself or herself, which is both distractive and dangerous especially in urgent situations. Therefore, the present disclosure aims to propose a surveillance system which overcomes the above-mentioned problems.

SUMMARY

According to one aspect of the present disclosure, a surveillance system may comprise: a control device and at least one robotic device. The control device is associated with a user. The control device further comprises one or more processors and a memory storing instructions. The instructions, when executed by the one or more processors, cause the control device operable by the user to: request to connect to the at least one robotic device; and in response to being connected to the at least one robotic device, communicate a characteristic of the user to the at least one robotic device. The at least one robotic device comprises a platform to carry the user. The at least one robotic device further comprises one or more processors and a memory storing instructions. The instructions, when executed by the one or more processors, cause the at least one robotic device to: in response to the request of the control device, verify identity of the control device of the user; in response to the identity of the control device of the user being verified, connect to the control device; define parameters of the at least one robotic device based on the characteristic of the user; and adjust the parameters of the at least one robotic device according to a riding pattern of the user.

In some embodiments, the at least one robotic device further comprises a vibration sensor. The vibration sensor may be configured to vibrate under a predetermined circumstance to alert the user of a coming situation. In some embodiments, the at least one robotic device further comprises a projector. The projector may be configured to project an indicator of a coming navigational behavior of the at least one robotic device to the user. In some embodiments, the at least one robotic device further comprises a display device. The display device may be configured to display one or more of the coming navigational behavior of the at least one robotic device, a real-time road condition, a crime scene situation. In some embodiments, the at least one robotic device further comprises an audio player. The audio player may be configured to play the instruction or a sound to the user.

In some embodiments, the control device includes one or more of a portable smartphone, a RFID device, an IoT device, and a tablet. In some embodiments, adjusting the parameters of the at least one robotic device according to a riding pattern of the user further comprises adjusting the parameters of the at least one robotic device using a look-up table. In some embodiments, adjusting the parameters of the at least one robotic device according to a riding pattern of the user further comprises adjusting the parameters of the at least one robotic device by predicting optimal parameters based on a neural network. In some embodiments, adjusting the parameters of the at least one robotic device according to a riding pattern of the user further comprises adjusting the parameters of the at least one robotic device using an expectation value of collected data during a trial period.

In some embodiments, the instructions, when executed by the one or more processors, cause the at least one robotic device further to allow the user to adjust the parameters of the at least one robotic device manually. In some embodiments, the instructions, when executed by the one or more processors, cause the at least one robotic device further to adjust the parameters of the at least one robotic device according to a detected scenario.

According to another aspect of the present disclosure, a surveillance method may comprise: verifying identity of a user; in response to identity of the user being verified, receiving information of a characteristic of the user; defining parameters of at least one robotic device based on the characteristic of the user; and adjusting the parameters of the at least one robotic device according to a riding pattern of the user.

According to yet another aspect of the present disclosure, a robotic device for surveillance may comprise: one or more processors; and a memory storing instructions. The instructions, when executed by the one or more processors, cause the robotic device to perform: verify identity of a user; in response to identity of the user being verified, receive information of a characteristic of the user; define parameters of the at least one robotic device based on the characteristic of the user; and adjust the parameters of the at least one robotic device according to a riding pattern of the user.

It is to be understood that both the foregoing general description and the following detailed description are exemplary and explanatory only, and are not restrictive of the invention.

BRIEF DESCRIPTION OF THE DRAWINGS

In order to illustrate the solutions of embodiments of the present disclosure more clearly, drawings used in connection with the embodiments will be briefly described below. It should be understood that the following drawings illustrate only certain embodiments of the present disclosure, and the scope of the present disclosure is not limited thereto.

DETAILED DESCRIPTION OF THE DRAWINGS

The present disclosure will now be described in further detail hereinafter with reference to the accompanying drawings, in which various exemplary embodiments are shown. This present disclosure may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
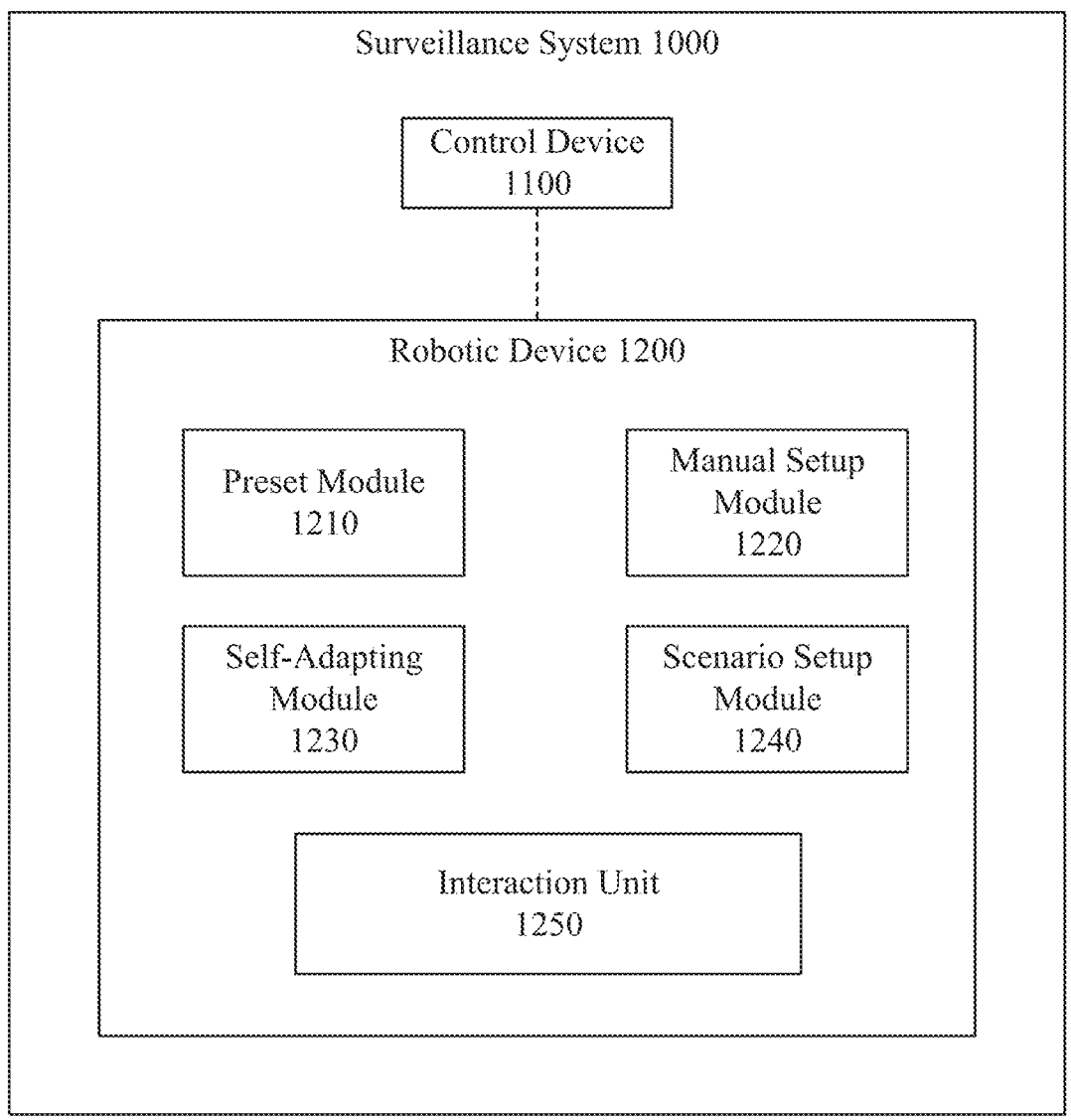
FIG. 1 illustrates an exemplary surveillance system assisted by robotic devices according to some embodiments of the present disclosure.

FIG. 1 illustrates an exemplary surveillance system 1000 assisted by one or more robotic devices according to some embodiments of the present disclosure. As shown in FIG. 1, the surveillance system 1000 may include a control device 1100, and one or more robotic devices 1200 (also conveniently referred to as a robotic device 1200). These components of the surveillance system 1000 may be communicative with one another and/or other devices (not shown) via Wi-Fi, cable, or another communication channel. In illustrated embodiments of the surveillance system 1000, the one or more robotic devices 1200 may be used to assist a user (e.g., a security officer) to handle a specific situation (e.g., a crime) via human-machine interaction.

Control Device 1100

The control device 1100 may be configured to allow a user (e.g., a security officer) to take over and interact with the one or more robotic devices 1200. Examples of the control device 1100 may include, but are not limited to, a client device (e.g., a RFID device or an IoT device associated with the user), a desktop, a laptop, a smartphone, a tablet, a pad, a mobile device. In some embodiments, the control device 1100 may be equipped with a specially designed application to facilitate the user to interact with the one or more robotic devices 1200. The control device 1100 may be a handheld device that may communicate with the one or more robotic devices via a cable or Wi-Fi. Alternatively, the control device 1100 may be equipped on the one or more robotic devices 1200, e.g., in the form of a dashboard.

Robot Device 1200

In the illustrated embodiments of FIG. 1, the robotic device 1200 may be configured to carry a user (e.g., a security officer) and may adjust its parameters according to preference of the user. Parameters of the robotic device 1200 (also referred to as robotic parameters) may include parameters that may be perceived by the user directly (also referred to as direct parameters), e.g., maximum speed, maximum acceleration, an obstacle avoidance radius, maximum turning angle, etc. In addition, the robotic parameters may also include "hidden" parameters, which refer to system or software parameters relating to the above mentioned direct parameters, e.g., a response time of the system 1000. In some embodiments, by adjusting the response time, the obstacle avoidance radius may be adjusted accordingly.

The robotic device 1200 may comprise a preset module 1210, a manual setup module 1220, a self-adapting module 1230, a scenario setup module 1240 and an interaction unit 1250. The preset module 1210 may be configured to define default robotic parameters according to physical parameters or characteristics of a user. Table 1 shows exemplary relationships between the default robotic parameters (e.g. speed and acceleration) and weight and height of a user. In this example, the robotic device 1200 may be configured to carry the user, and the robotic parameters may be adjusted according to the weight and height of the user.

TABLE 1

| Weight | Height | |
| --- | --- | --- |
| | Small | Tall |
| Light | Higher acceleration<br>Higher speed | Lower acceleration<br>Higher speed |
| Heavy | Lower acceleration<br>Higher speed | Lower acceleration<br>Lower speed |

As shown in Table 1, when the user is light in weight and small in size, the robotic device 1200 carrying the user may have a higher default acceleration and speed; when the user is light in weight and tall in height, or heavy in weight and small in size, the robotic device 1200 may have a lower default acceleration and a higher default speed; and when the user is heavy in weight and tall in height, the robotic device 1200 may have a lower default acceleration and a lower speed. The preset module 1210 may define default robotic parameters according to physical measurements or other parameters associated with the user to be carried. Robotic parameters, such as speed and acceleration, may also be adjusted according to other physical parameters or heath conditions of the user, e.g., heart rate, or even emotional parameters of the user. It should be understood that the above examples only show exemplary robotic parameters, other robotic parameters may also be adjusted and are contained within the scope of the present disclosure. Moreover, the adjustment of the robotic parameters may not necessarily be linear.

In some embodiments, the characteristics or parameters of a user may be communicated to the robotic device 1200 in advance. For example, the characteristics or parameters associated with a user may be preliminarily stored in the control device 1100 or the robotic device 1200. In the example of being stored in the control device 1100, the characteristics or parameters of a user may be stored in a user's device associated with the user, e.g., a Radio-frequency identification (RFID) device, an Internet of Things (IoT) device, etc., for security reasons. During the use, the user's device may request to connect to a robotic device 1200, e.g., via a remote controller. The robotic device 1200 may verify the user's identity or the user device's identity. If it is confirmed that the user is a security officer instead of a passerby or a suspicious person, the robotic device 1200 may allow data transmission between the user device and itself, and the characteristics or parameters of the user may be transferred to the robotic device 1200. In another example, the robotic device 1200 may receive a control request of a user and verify identity of the user. Once the user's identity is verified, the robotic device 1200 may allow the user to input characteristics or parameters (physical or emotional) of the user.

Alternatively, the characteristics or parameters of a user may be communicated to the robotic device 1200 in real-time via the control device 1100. In some embodiments, some of the user's characteristics or parameters may be detected by the robotic device 1200 in real time while the user is riding the robotic device 1200.

The manual setup module 1220 may be configured to allow a user to manually set or adjust the robotic parameters, e.g., speed and acceleration. In some embodiments, a sliding bar or another suitable mechanism may be equipped on the robotic device 1200. The sliding bar or the suitable mechanism may be configured to allow a user to feel impact of acceleration or speed of the robotic device 1200 if the user is riding on it, and thus select the most suitable acceleration or speed for the user.

The self-adapting module 1230 may be configured to collect and analyze a riding pattern or actions of a specific user in a given time period (also defined as a trial period). A riding pattern of a specific user may include actions initiated by the specific user to take over control of the robotic device 1200 and/or adjust robotic parameters of the robotic device 1200. For example, a riding pattern of a user may include the user's switching off automatic driving mode of the robotic device 1200, taking over the control of the robotic device 1200, adjusting robotic parameters of the robotic device 1200 (e.g., speed, acceleration, direction, etc.). The trial period may be one or two days. The self-adapting module 1230 may analyze the collected riding pattern or actions of the user to learn, e.g., why the user has switched off automatic driving mode and taken over the control of robotic device 1200, and dynamically adjusted relevant robotic parameters, etc. Table 2 shows an example of parameter adjustment of the self-adapting module 1230 according to takeover information.

TABLE 2

| Reasons of takeover | Targets of adjustment | Results of adjustments |
| --- | --- | --- |
| Recurring manual acceleration | Increase the maximum acceleration | Less manual acceleration operation |
| Recurring manual deceleration | Decrease the maximum acceleration | Less manual deceleration operation |
| Recurring deceleration before reaching the maximum speed | Decrease the maximum speed | Less manual deceleration operation |

As shown in Table 2, when the user frequently takes over to accelerate or decelerate the robotic device 1200, the self-adapting module 1230 may increase or decrease the maximum acceleration itself respectively so as to reduce the frequency of manual takeover by the user. Similarly, when the user frequently slows down the robotic device 1200 before it reaches the maximum speed, the self-adapting module 1230 may decrease the maximum speed itself automatically so as to eliminate the need of manual deceleration by the user. It should be understood that the self-adapting module 1230 may adjust other parameters based on various data collected during the trial period, such as takeover information, and these are not limited by the embodiments of the present disclosure.

In some embodiments, the self-adapting module 1230 may be configured to modify relevant robotic parameters via a plurality adjustment algorithms. For example, the self-adapting module 1230 may use a look-up table to modify relevant robotic parameters. The self-adapting module 1230 may check for a corresponding adjustment percentage in the look-up table based on the manual adjustment or takeover frequency of the user. Table 3 shows an example of the look up table.

TABLE 3

| Adjustment frequency (times/5 mins) | Speed adjustment percentage | Acceleration adjustment percentage |
|---|---|---|
| 10 | 0 (Normal, no need to adjust) | 0 |
| 20 | 15% | 5% |
| 30 | 30% | 10% |
| 40 | 40% | 15% |
| 50 | 50% | 15% |

As shown in Table 3, the self-adapting module 1230 may monitor the frequency of user's speed adjustment within a certain period. The predetermined look-up table associates a user's adjustment frequency with a specific speed or acceleration adjustment percentage. For example, if the user adjusts the speed of the robotic device 1200 ten times within a period of five minutes, the self-adapting module 1230 may automatically search for a speed adjustment percentage in the look-up table, which is zero in this case, indicating that such an adjustment frequency by the user is normal during a regular use and thus the robotic device 1200 may not adjust its speed or acceleration. However, when the user adjusts the speed of the robotic device 1200 20 times within the past five minutes, after checking the look-up table, the self-adapting module 1230 may adjust the speed by 15% and acceleration by 5% automatically so as to reduce the frequency of the manual adjustment by the user or eliminate the need of manual adjustment completely. It should be understood that association between other user parameters and robotic parameters may be stored in the lookup table, and are not limited by the embodiments of the present disclosure.

In another example, the self-adapting module 1230 may use an expectation value to modify relevant robotic parameters. For example, during the trial period, the self-adapting module 1230 may collect various sequence signals of the robotic device 1200. For example, the self-adapting module 1230 may obtain the speed of the robot over a relatively long period (e.g. five minutes), and then calculate its mean value including, e.g., simple mean value, weighted mean value, median, etc. With these statistics, the self-adapting module 1230 may set the maximum or average speed of the robotic device 1200 automatically during the actual use so as to adapt to the user's habits.

In yet another example, the self-adapting module 1230 may adopt a machine learning algorithm to modify relevant robotic parameters. As described above, the self-adapting module 1230 may collect various sequence signals of the robotic device 1200. With these signals, the self-adapting module 1230 may conduct a complex machine learning algorithm. For example, the self-adapting module 1230 may use Recurrent Neural Networks (RNN) or Long Short-Term Memory (LSTM) model to predict the optimal robotic parameters. Specifically, the user may be firstly required to ride on the robotic device 1200 for a period long enough (e.g. 30 minutes) so as to simulate an actual scenario. Accordingly, the self-adapting module 1230 may collect the robotic parameters set by the user, and these parameters may be regarded as "optimal parameters." During a training phase, input parameters, e.g., adjustment frequency during the initial stage (e.g. the first one minute) and physical parameters of the user, may be input into a neural network. The neural network may be trained to obtain the optimal parameters based on the sequence signals.

During the usage phase, the self-adapting module 1230 may use the trained neural network to compute the optimal parameters based on the usage inputs and sequence signals in a relatively short time, thus enhancing user experience. It should be understood that the self-adapting module 1230 may also modify relevant parameters via other algorithms, which are not limited by the embodiments of the present disclosure.

The scenario setup module 1240 may be configured to adjust the robotic parameters according to the scenarios detected by the surveillance system 1000. In Table 4, it lists some examples showing adjustments made by the scenario setup module 1240 according to different scenarios and their urgent levels.

TABLE 4

| Urgent level | Scenarios | Adjustments |
|---|---|---|
| Urgent | Fighting | Set maximum acceleration and maximum speed respectively to the maximum value of the system |
| Normal | Stealing/Theft | Acceleration increases by 60% Speed increases by 20% |
| Not urgent | Quarreling | Acceleration increases by 20% Speed remains unchanged |

As shown in Table 4, the scenario setup module 1240 may adjust the robotic parameters differently under different scenarios and based on their urgent level. It should be understood that the scenario setup module 1240 may adjust other parameters based on various other scenarios detected by the surveillance system 1000, and these are not limited by the embodiments of the present disclosure.

Interaction Modules 1250

Figure 2:
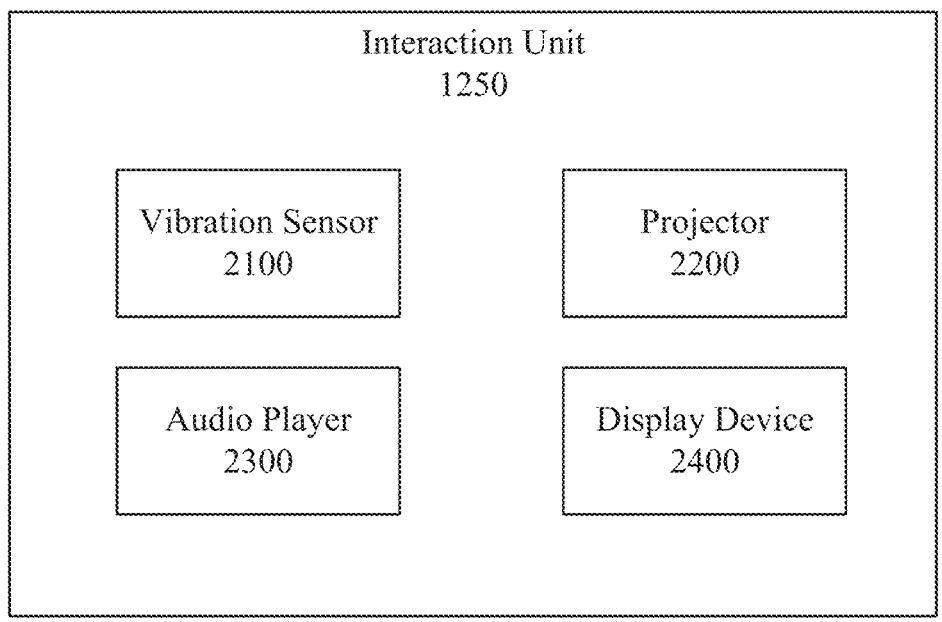
FIG. 2 illustrates components of an exemplary interaction unit of a robotic device according to some embodiments of the present disclosure.

FIG. 2 shows an exemplary interaction unit 1250 equipped on the robotic device 1200 according to one embodiment of the present disclosure. The interaction unit 1250 is equipped on the robotic device 1200 at least for improving the user's navigation experience. In some embodiments, upon receiving an instruction or event information from the control device 1100, the interaction unit 1250 may perform a responding action. For example, the responding action may be indicate a navigational behavior of the robotic device 1200 to the user, e.g., turning right or left, accelerating or decelerating, etc. Other type of responding actions may also be possible. Specifically, the interaction unit 1250 may include, but is not limited to, the following devices:

A vibration sensor 2100, which may start vibrating under certain predetermined circumstances so as to alert the user of a coming situation;

A projector 2200, which may project contents such as indicators on the floor. The indicators may show coming navigational behaviors of the robotic device 1200. For example, it may be used to inform the user riding on the robot that the robotic device 1200 is making a left or right turn;

An audio player 2300, which may play simple instructions or sounds to inform the user. For example, an instruction may be an alarm whistle from gentle to sharp depending on the urgent level of the situation; and A display device 2400, which may display a real-time road condition, a crime scene, or a possible escape path of a criminal. The display device 2400 may also display coming navigational behaviors of the robotic device 1200.

It should be understood that other interaction units 1250 may also be equipped on the robotic device 1200 so as to facilitate the user, and are not limited by the embodiments of the present disclosure.

Figure 3:
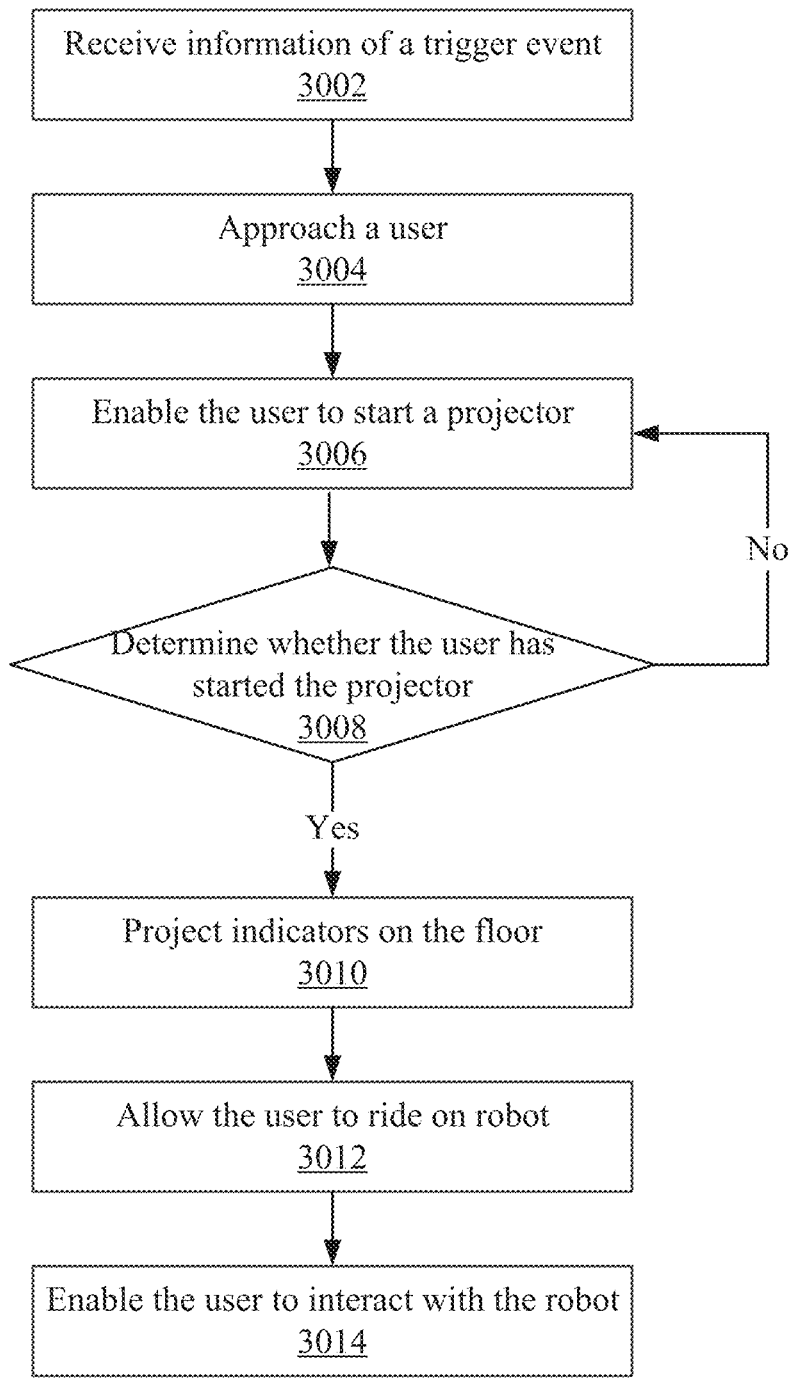
FIG. 3 illustrates a flow chart of an exemplary working process of a robotic device in FIG. 1 according to some embodiments of the present disclosure.

Referring to FIG. 3, an exemplary working process of the robotic device 1200 in FIG. 1 is illustrated according to some embodiments of the present disclosure. At block 3002, information of a trigger event may be received. For example, the surveillance system 1000 may analyze video clips captured by one or more cameras and determine whether there is a trigger event. If it is determined that there is a trigger even, the surveillance system 1000 may inform the robotic device 1200 of the trigger event via a communication mean, e.g., Wi-Fi or cable.

At block 3004, the robotic device 1200 may approach a user (e.g., a security officer). At block 3006, the user may be enabled to start the projector 2200. At block 3008, the robotic device 1200 may determine whether the user has started the projector 2200. If it is determined that the user has started the projector 2200, then at block 3010, the robotic device 1200 may project indicators on the floor. Otherwise, the robotic device 1200 may keep detecting if the user has started the projector 2200. For example, if the security officer has a control device 1100, he or she may be enabled to start the projector 2200 which may project an indicator on the floor. If the security officer does not have a control device 1100, the security officer may be requested to connect to a control device 1100 first, before he or she can start the projector 2200.

At block 3012, the robotic device 1200 may allow the user (e.g., the security officer) to ride on it. At block 3014, the robotic device 1200 may allow the user to interact with the robotic device 1200. For example, the user may be allowed to change the robotic parameters according to actual needs. Meanwhile, the robotic device 1200 may inform the user of its behavior via the interaction units 1250 described above with reference to FIG. 2.

Table 5 shows the behaviors of the robotic device 1200 and the corresponding human-machine interactions.

TABLE 5

| Behavior | Vibration device | Projector | Audio player |
| --- | --- | --- | --- |
| Acceleration/ Deceleration | Gradually stronger/ Gradually weaker | Thick arrow/ Fine arrow | Sound |
| Turn left/ Turn right | Long vibration/ Short vibration | Left arrow/ Right arrow | Sound |
| Pedestrian nearby | N/A | N/A | Sound |
| Approaching crime scene | Enabled | Disabled | Disabled (alarms may still be reserved) |

As shown in Table 5, if the robotic device 1200 is accelerating, the vibration device 2100 may increase the intensity of the vibration and the vibration may become stronger, and/or the projector 2200 may project a thick arrow. On the contrary, if the robotic device 1200 is decelerating, the vibration device 2100 may decrease the intensity of the vibration and the vibration may become weaker, and/or the projector 2200 may project a thin arrow. Meanwhile, the audio player 2300 may play instructions indicating the acceleration or deceleration of the robotic device 1200.

If the robotic device 1200 is turning left, the vibration device 2100 may change the vibration longer and the projector 2200 may project a left arrow. On the contrary, if the robotic device 1200 is turning right, the vibration device may change the vibration shorter and the projector 2200 may project a right arrow. Meanwhile, the audio player 2300 may play instructions indicating the left turn or right turn of the robotic device 1200.

Moreover, if there are pedestrians nearby, the audio player 2300 may play alarms to alert the pedestrians. If the robotic device 1200 is approaching a crime scene, it may turn off the projector 2200 and/or the audio player 2300 to avoid alerting the criminal. Instead, the vibration device 2100 may vibrate to inform the security officer of the situation or the actions of the robotic device 1200.

Figure 4:
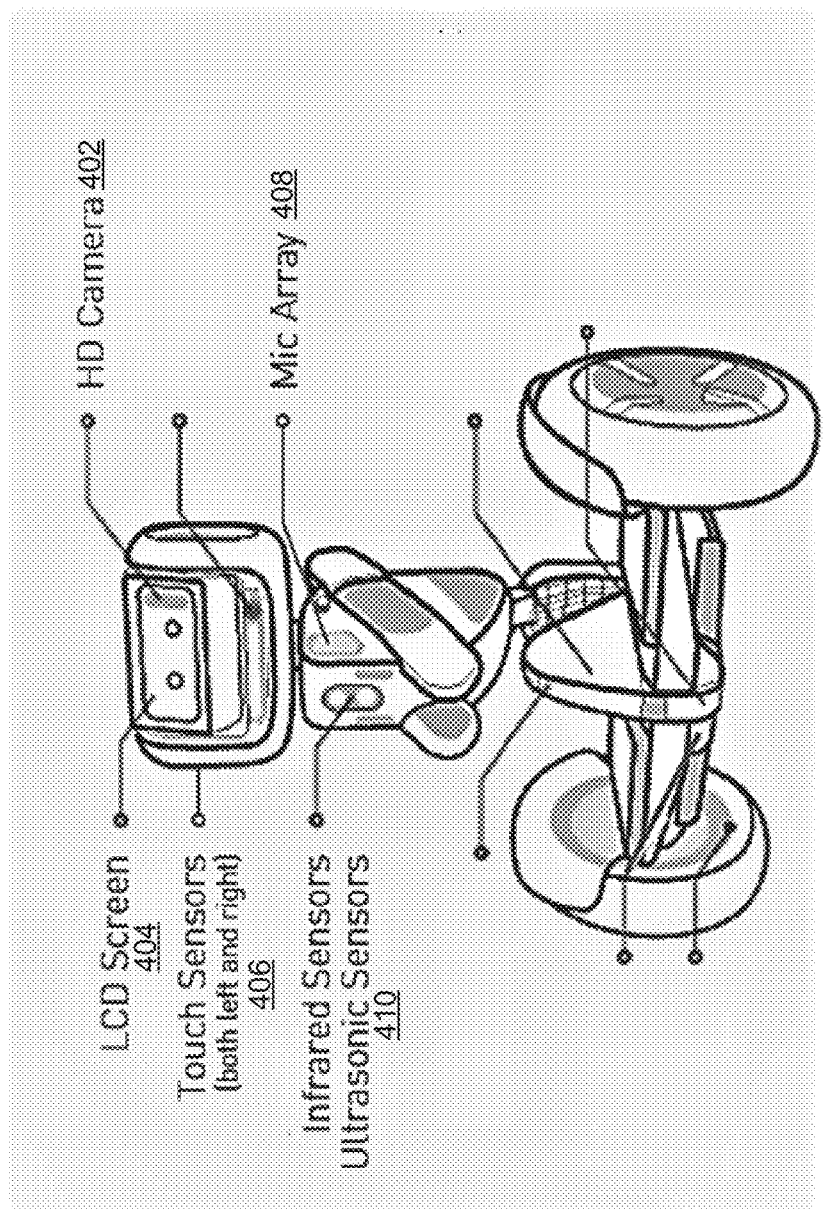
FIG. 4 illustrates a diagram showing an exemplary robotic device in FIG. 1 according to some embodiments of the present disclosure.

FIG. 4 illustrates a diagram showing an exemplary robotic device 1200 of the surveillance system 1000 in FIG. 1 according to some embodiments of the present disclosure. In the illustrated embodiments, the robotic device 1200 includes a HD camera 402, a LCD screen 404, touch sensors 406 on both left and right side, infrared sensors and ultrasonic sensors 410 and microphone array 408. The LCD screen 404 may be an example of the display device 2400. The microphone array 408 may be an example of the audio player 2300. The touch sensors 406 on both left and right side may be examples of vibration sensors 2100.

Figure 5:
FIG. 5 illustrates a diagram showing an exemplary user interface of a control device in FIG. 1 according to some embodiments of the present disclosure.

FIG. 5 illustrates a diagram showing an exemplary user interface of a control device 1100 of the surveillance system 1000 in FIG. 1 according to some embodiments of the present disclosure. In the illustrated embodiments, the user interface 502 may be displayed on the control device 1100. The user interface 502 may allow the user to view a video of a trigger event, or a potential crime scene.

Figure 6:
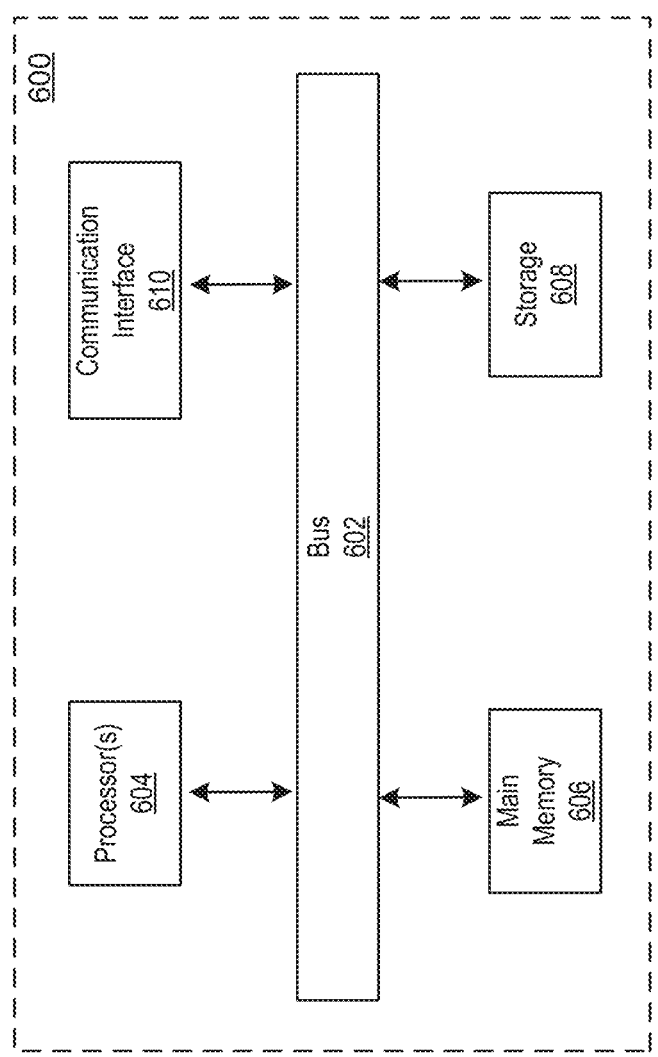
FIG. 6 illustrates a block diagram showing structures of an example control device or some components of a robotic device in FIG. 1 in which any of the embodiments described herein may be implemented.

FIG. 6 is a block diagram that illustrates a control device 1100 or some components of a robotic device 1200 in FIG. 1 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Although the above-mentioned surveillance system is used for human detection and surveillance, the present disclosure is not limited thereto, but can be applied to detect general objects, such as automobiles or animals. Further, those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality. In applications according to present application, one element may perform functions of several technical features recited in claims. Any reference signs in the claims should not be construed as limiting the scope.

What is claimed is:

1. A surveillance system, comprising a control device and at least one robotic device, wherein:
the control device is associated with a user, wherein the control device further comprises one or more processors and a memory storing instructions that, when executed by the one or more processors, cause the control device operable by the user to:
request to connect to the at least one robotic device; and
in response to being connected to the at least one robotic device, communicate a characteristic of the user to the at least one robotic device; and
the at least one robotic device comprises a platform to carry the user and a projector, wherein the at least one robotic device further comprises one or more processors and a memory storing instructions that, when executed by the one or more processors, cause the at least one robotic device to:
in response to the request of the control device, verify identity of the control device of the user;
in response to the identity of the control device of the user being verified, connect to the control device;
define parameters of the at least one robotic device based on the characteristic of the user;
carry the user based on the parameters; and
adjust the parameters of the at least one robotic device according to a riding pattern of the user while carrying the user, wherein the riding pattern of the user includes one or more actions initiated by the user to take over a control of the at least one robotic device while being carried by the at least one robotic device,
wherein the projector is configured to:
project an indicator of a coming navigational behavior of the at least one robotic device on the floor, wherein the indicator includes a thick arrow if the robotic device is accelerating and a thin arrow if the robotic device is decelerating.

2. The surveillance system according to claim 1, wherein the at least one robotic device further comprises a display device, the display device configured to display one or more of the coming navigational behavior of the at least one robotic device, a real-time road condition, and a crime scene situation.

3. The surveillance system according to claim 1, wherein the at least one robotic device further comprises an audio player, the audio player configured to play the instruction or a sound to the user.

4. The surveillance system according to claim 1, wherein the control device includes one or more of a portable smartphone, a RFID device, an IoT device, and a tablet.

5. The surveillance system according to claim 1, wherein adjusting the parameters of the at least one robotic device according to a riding pattern of the user further comprises adjusting the parameters of the at least one robotic device using a look-up table.

6. The surveillance system according to claim 1, wherein adjusting the parameters of the at least one robotic device according to a riding pattern of the user further comprises adjusting the parameters of the at least one robotic device by predicting optimal parameters based on a neural network.

7. The surveillance system of claim 1, wherein adjusting the parameters of the at least one robotic device according to a riding pattern of the user further comprises adjusting the parameters of the at least one robotic device using an expectation value of collected data during a trial period.

8. The surveillance system according to claim 1, wherein the instructions, when executed by the one or more processors, cause the at least one robotic device further to allow the user to adjust the parameters of the at least one robotic device manually.

9. The surveillance system of claim 1, wherein the instructions, when executed by the one or more processors, cause the at least one robotic device further to adjust the parameters of the at least one robotic device according to a detected scenario.

10. A surveillance method, comprising:
verifying identity of a user based on information transmitted from at least one control device;
in response to identity of the user being verified, receiving information of a characteristic of the user from the at least one control device;
defining parameters of at least one robotic device based on the characteristic of the user;
carrying, by the at least one robotic device, the user based on the parameters;
adjusting the parameters of the at least one robotic device according to a riding pattern of the user, wherein the riding pattern of the user includes one or more actions initiated by the user to take over a control of the at least one robotic device while being carried by the at least one robotic device; and
projecting, by the at least one robotic device, an indicator of a coming navigational behavior of the at least one robotic device on the floor, wherein the indicator includes a thick arrow if the robotic device is accelerating and a thin arrow if the robotic device is decelerating.

11. The surveillance method according to claim 10, wherein adjusting the parameters of the at least one robotic device according to a riding pattern of the user further comprises adjusting the parameters of the at least one robotic device using a look-up table.

12. The surveillance method according to claim 10, wherein adjusting the parameters of the at least one robotic device according to a riding pattern of the user further comprises adjusting the parameters of the at least one robotic device by predicting optimal parameters based on a neural network.

13. The surveillance method according to claim 10, wherein adjusting the parameters of the at least one robotic device according to a riding pattern of the user further comprises adjusting the parameters of the at least one robotic device using an expectation value of collected data during a trial period.

14. The surveillance method according to claim 10, further comprises:
   adjusting the parameters of the at least one robotic device according to a detected scenario.

15. A robotic device for surveillance, the robotic device comprising:
   one or more processors; and
   a memory storing instructions that, when executed by the one or more processors, cause the robotic device to:
   verify identity of a user based on information transmitted from at least one control device;
   in response to identity of the user being verified, receive information of a characteristic of the user from the at least one control device;
   define parameters of the robotic device based on the characteristic of the user;
   carry the user based on the parameters;
   adjust the parameters of the robotic device according to a riding pattern of the user, wherein the riding pattern of the user includes one or more actions initiated by the user to take over a control of the robotic device while being carried by the robotic device; and
   project an indicator of a coming navigational behavior of the robotic device on the floor, wherein the indicator includes a thick arrow if the robotic device is accelerating and a thin arrow if the robotic device is decelerating.

* * * * *